US008194053B2

(12) United States Patent
Kim et al.

(10) Patent No.: US 8,194,053 B2
(45) Date of Patent: Jun. 5, 2012

(54) TOUCH PANEL INCLUDING NANOWIRE

(75) Inventors: Changjung Kim, Yongin-si (KR); Youngsoo Park, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 481 days.

(21) Appl. No.: 12/385,567

(22) Filed: Apr. 13, 2009

(65) Prior Publication Data
US 2010/0013797 A1 Jan. 21, 2010

(30) Foreign Application Priority Data

Jul. 16, 2008 (KR) ........................ 10-2008-0069300

(51) Int. Cl.
*G06F 3/043* (2006.01)
(52) U.S. Cl. ..................................... 345/177; 178/18.04

(58) Field of Classification Search .................. None
See application file for complete search history.

(56) References Cited

U.S. PATENT DOCUMENTS

| 5,673,041 A * | 9/1997 | Chatigny et al. ............... 341/22 |
| 2007/0229479 A1 * | 10/2007 | Choo et al. ..................... 345/177 |
| 2009/0046078 A1 * | 2/2009 | Kent ............................. 345/176 |
| 2009/0309843 A1 * | 12/2009 | Kim et al. ..................... 345/173 |

FOREIGN PATENT DOCUMENTS

| JP | 06-348395 | 12/1994 |
| JP | 07-282699 | 10/1995 |
| JP | 2004-046500 | 2/2004 |

* cited by examiner

Primary Examiner — Christopher R Lamb
(74) Attorney, Agent, or Firm — Harness, Dickey & Pierce, P.L.C.

(57) ABSTRACT

A touch panel may include a plurality of piezoelectric nanowires between a plurality of first transparent electrodes and plurality second transparent electrodes that cross each other; an ultrasonic wave generator configured to generate ultrasonic waves from the piezoelectric nanowires; and at least one ultrasonic wave echo sensor configured to detect ultrasonic waves that are generated from the plurality of piezoelectric nanowires and return to the plurality of piezoelectric nanowires after colliding with an object approaching the plurality of piezoelectric nanowires.

9 Claims, 5 Drawing Sheets

TOUCH PANEL INCLUDING NANOWIRE

PRIORITY STATEMENT

This application claims priority under 35 U.S.C. §119 to Korean Patent Application No. 10-2008-0069300, filed on Jul. 16, 2008, in the Korean Intellectual Property Office (KIPO), the entire contents of which is incorporated herein by reference.

BACKGROUND

1. Field

Example embodiments relate to touch panels using nanowires.

2. Description of the Related Art

A touch panel is an input device that may be installed in front of an electronic apparatus, e.g. personal computers, notebooks, or portable media players (PMPs), and may be used to input a specific order or data to the electronic apparatus by contacting or drawing letters or pictures using a finger or a pen. Due to the increasing demand for convenience, the demand for the touch panel has greatly increased. Conventional touch panels mainly use a piezo-resistance or an electrostatic force to input data and are difficult to manufacture in a large size.

There is another type of touch panel that uses ultra sonic waves. However, when such a touch panel is manufactured in a large size, a signal generation unit is required on the side of the touch panel, and thus, the distance for generating a signal is increased, and the signal processing may be complicated.

The touch panels described above are contact type touch panels. In contact type touch panels, a finger or a pen may be used to directly contact a surface of the touch panel, and as a result, the surface of the touch panel may be damaged.

SUMMARY

Example embodiments provide a touch panel that may be manufactured in a larger size.

According to example embodiments, a touch panel may include a first transparent substrate; a plurality of first transparent electrodes having a strip shape on the first transparent substrate; a plurality of piezoelectric nanowires vertically on the plurality of first transparent electrodes; a plurality of second transparent electrodes having a strip shape to perpendicularly cross the plurality of first transparent electrodes on the plurality of the piezoelectric nanowires; a second transparent substrate on the plurality of second transparent electrodes; an ultrasonic wave generator configured to generate an ultrasonic wave from the plurality of piezoelectric nanowires by applying a pulse voltage to the ultrasonic wave generator; and at least one ultrasonic wave echo sensor configured to detect ultrasonic waves that may be generated from the plurality of piezoelectric nanowires and returned to the plurality of piezoelectric nanowires after colliding with an object approaching the plurality of piezoelectric nanowires.

The ultrasonic wave generator may be connected to the plurality of first transparent electrodes or the plurality of second transparent electrodes. The at least one ultrasonic wave echo sensor may include a first ultrasonic wave echo sensor connected to the plurality of first transparent electrodes and a second ultrasonic wave echo sensor connected to the plurality of second transparent electrodes.

The plurality of piezoelectric nanowires may be a plurality of ZnO nanowires. The touch panel may further include insulating filler between the plurality of piezoelectric nanowires. The insulating filler may be formed of $SiO_2$ or a poly vinyl difluoride (PVDF) group material. The plurality of piezoelectric nanowires may be on regions where the plurality of first transparent electrodes and the plurality of second transparent electrodes cross each other.

The plurality of first and second transparent electrodes may be formed of a material selected from the group including indium tin oxide (ITO), aluminum zinc oxide (AZO), and indium zinc oxide (IZO). The plurality of piezoelectric nanowires may be formed to have a height of about 0.1 μm to 10 μm.

BRIEF DESCRIPTION OF THE DRAWINGS

Example embodiments will be more clearly understood from the following brief description taken in conjunction with the accompanying drawings. FIGS. 1-4C represent non-limiting, example embodiments as described herein.

FIG. 1 is a schematic plan view of a configuration of a non-contact touch panel using nanowires, according to example embodiments;

FIG. 2 is a cross-sectional view taken along line II-II of FIG. 1;

FIG. 3 is a partially exploded perspective view of the structure of the non-contact touch panel using ZnO nanowires as piezoelectric nanowires, according to example embodiments; and FIGS. 4A through 4C are cross-sectional views of a method of manufacturing a non-contact touch panel using nanowires, according to example embodiments.

Figure 1:
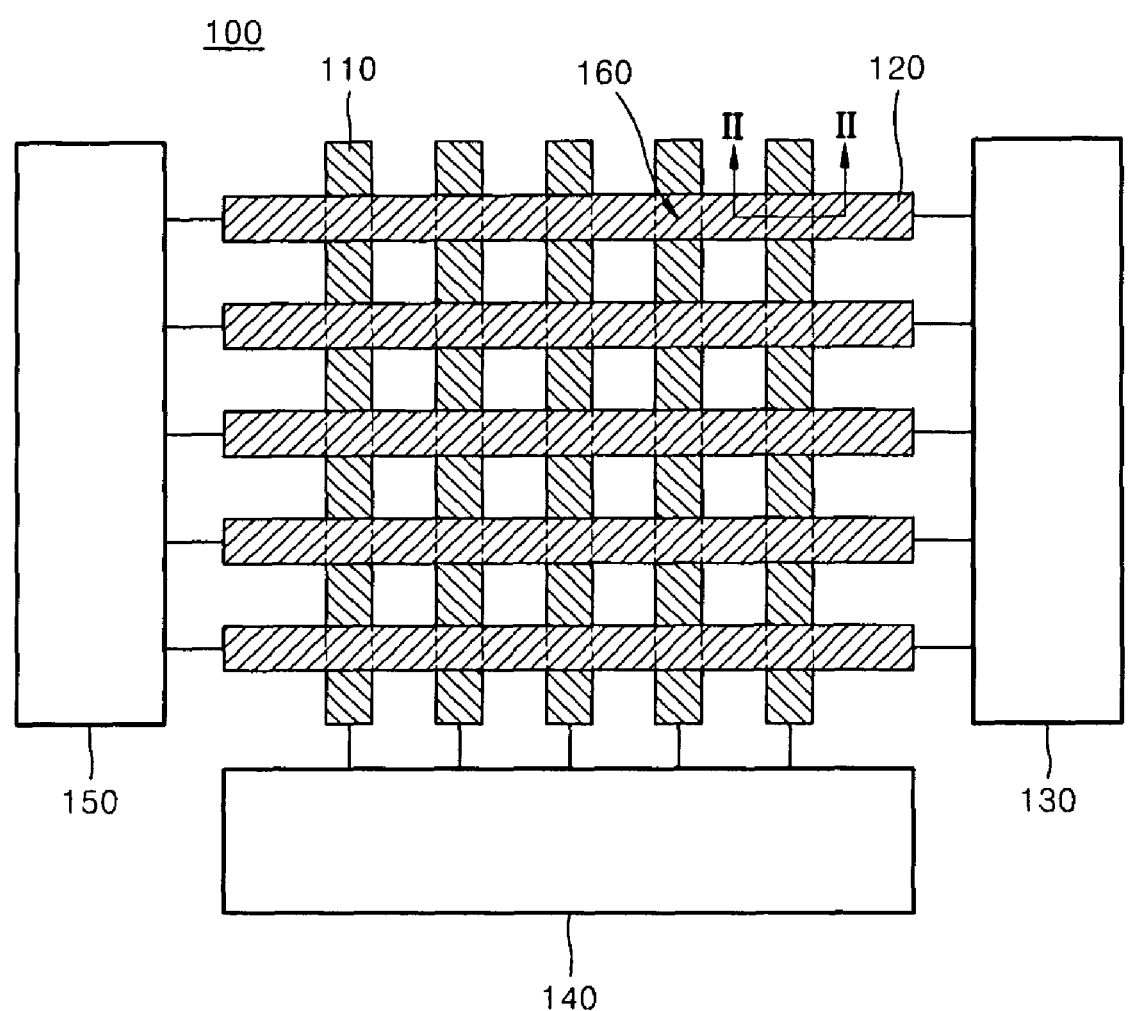

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted. In the drawings, the thicknesses of layers and regions are exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic plan view showing a configuration of a touch panel 100, for example a non-contact touch panel using nanowires, according to example embodiments. Referring to FIG. 1, first transparent electrodes 110 and second transparent electrodes 120 may have a strip shape and may be disposed in directions perpendicular to each other. First ends of the second transparent electrodes 120 may be connected to an ultrasonic wave generator 130. First ends of the first transparent electrodes 110 may be connected to a first pulse echo sensor 140, and second ends of the second transparent electrodes 120 may be connected to a second pulse echo sensor 150. A plurality of nanowires 162 (Refer to FIG. 2) may be formed in cell regions 160 where the first transparent electrodes 110 cross the second transparent electrodes 120, as will be described later.

Figure 2:
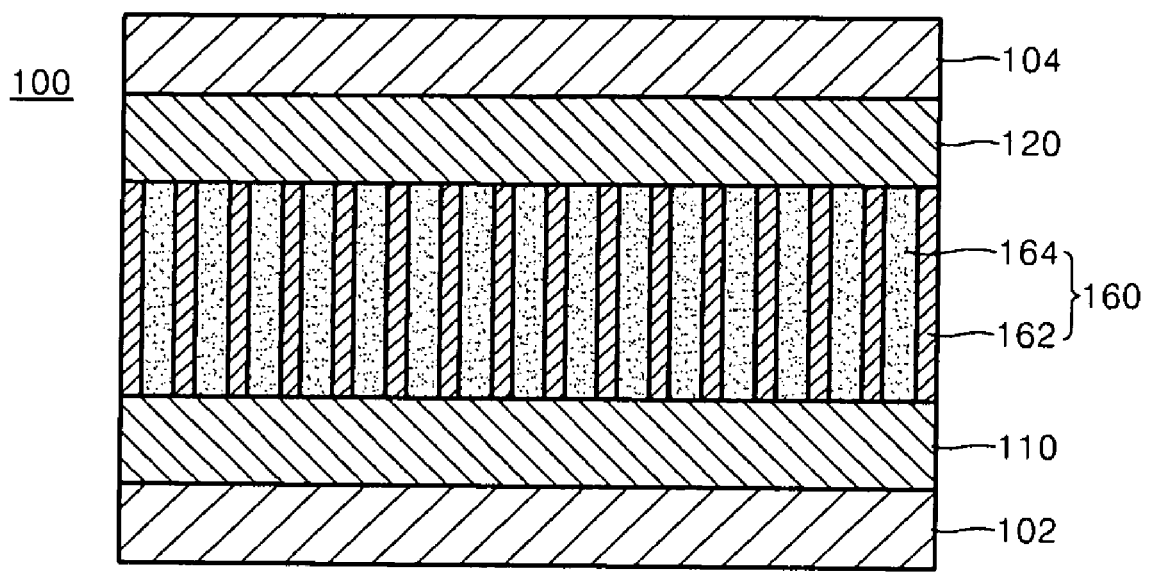

FIG. 2 is a cross-sectional view taken along line II-II of FIG. 1. Referring to FIG. 2, the non-contact touch panel 100 may include a first transparent substrate 102, one of the first transparent electrodes 110 disposed on the first transparent substrate 102, piezoelectric nanowires 162 vertically disposed on the first transparent electrode 110, second transparent electrodes 120 disposed on the piezoelectric nanowires 162, and a second transparent substrate 104 disposed on the second transparent electrode 120. The first transparent substrate 102 and the second transparent substrate 104 are omitted in FIG. 1 for convenience.

Lower parts of the piezoelectric nanowires 162 may be electrically connected to the first transparent electrode 110, and upper parts of the piezoelectric nanowires 162 may be electrically connected to the second transparent electrode 120. The first and second transparent substrates 102 and 104 may be formed of a flexible transparent polymer. Also, the first and second transparent electrodes 110 and 120 may be formed of transparent metal oxide, for example, indium tin oxide (ITO), aluminum zinc oxide (AZO), or indium zinc oxide (IZO).

The piezoelectric nanowires 162 may be Zinc-oxide (ZnO). ZnO may have a higher optical transmittance and a lower piezoelectric constant as compared to lead zirconate titanate (PZT). (Hereinafter, piezoelectric nanowires 162 formed of ZnO will be referred to as "ZnO nanowires 162") However, when ZnO is grown in nanowire shapes, the ZnO nanowires, grown as the piezoelectric nanowires 162, may be in a single crystalline state, and thus, the piezoelectric constant may be increased as compared to when the ZnO nanowires are grown in a thin film state. The piezoelectric constant of the ZnO nanowires may increase as the ratio of the height to the diameter of the ZnO nanowires 162 increases. However, if the height of the ZnO nanowires is excessively high, the possibility of being damaged may be increased. Thus, when the piezoelectric nanowires 162 formed of ZnO nanowires having a diameter of about 20 to 100 nm are used, the height of the piezoelectric nanowires 162 may be about 0.1 to 10 μm. In the example embodiments, ZnO nanowires are described as an example; however, the piezoelectric nanowires 162 may be formed of any material that may be grown in a nanowire shape and may have piezoelectric properties.

As depicted in FIG. 2, an insulating filler 164 may be provided between the piezoelectric nanowires 162. The insulating filler 164 may remove air gaps between the piezoelectric nanowires 162 by filling the gap between the piezoelectric nanowires 162, and thus, protecting the piezoelectric nanowires 162. For example, the insulating filler 164 may prevent or reduce the piezoelectric nanowires 162 from being damaged by a continuous compressive force when the non-contact touch panel 100 is used. For this purpose, the insulating filler 164 may have some elasticity. Also, the insulating filler 164 may have an insulating property in order to avoid electrical short circuits between the first and second transparent electrodes 110 and 120.

The insulating filler 164 may be formed of an oxide, an inorganic compound, or an organic compound. The insulating filler 164 may be formed of $SiO_2$. Also, the insulating filler 164 may be formed of a material that has high efficiency in converting a mechanical signal to an electrical signal. For example, when a poly vinyl difluoride (PVDF) group material is used, the capability of vibration detection caused by ultrasonic waves may be increased. However, if the piezoelectric nanowires 162 have a strength strong enough to withstand the continuous compressive force, the insulating filler 164 may be omitted. The cell regions 160 may be cell regions in which the first transparent electrodes 110 and the second transparent electrodes 120 cross each other, and the cell regions 160 may each include a plurality of piezoelectric nanowires 162 and the insulating filler 164 filled between the piezoelectric nanowires 162.

Figure 3:
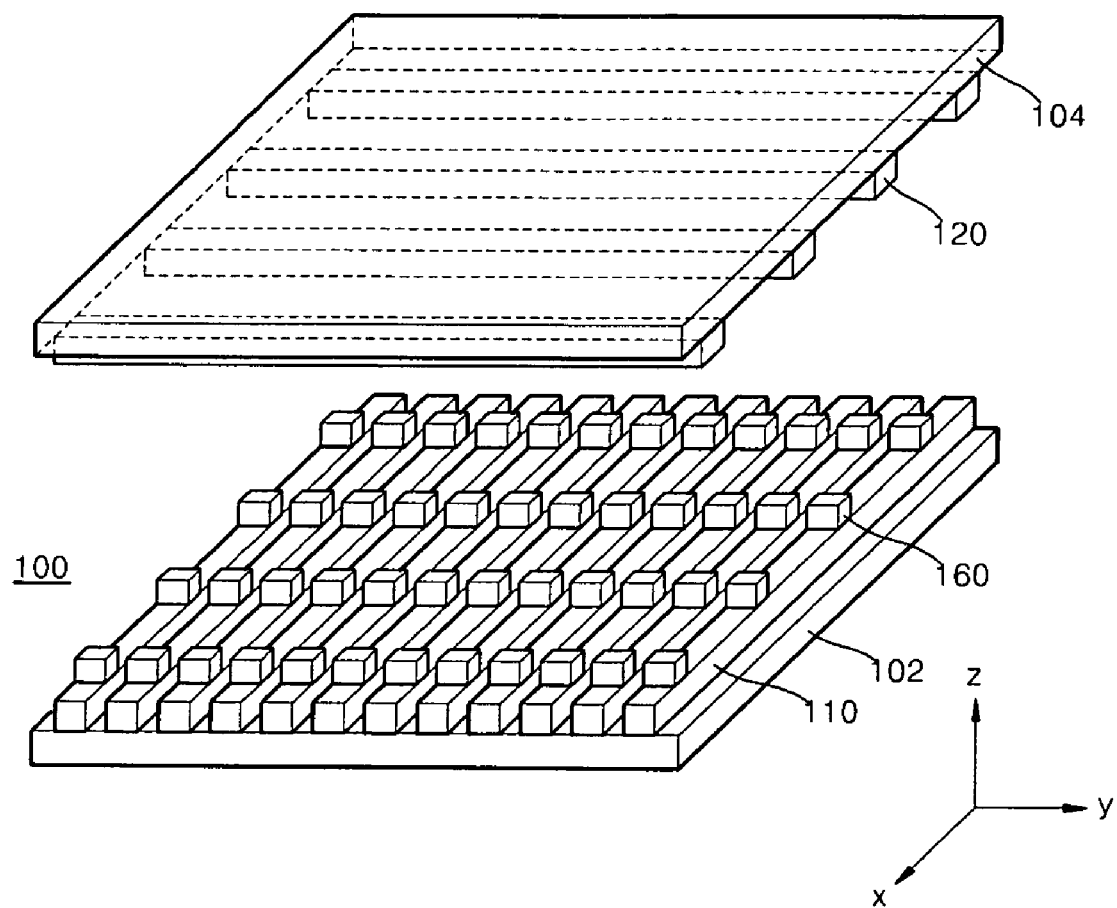

FIG. 3 is a partially exploded perspective view of the structure of the non-contact touch panel 100 using ZnO nanowires as the piezoelectric nanowires 162, according to example embodiments. Referring to FIG. 3, the first transparent electrodes 110 disposed on a top surface of the first transparent substrate 102 extend along an x-axis direction and may be arranged parallel to each other. The second transparent electrodes 120 disposed on a bottom surface of the second transparent substrate 104 extend along a y-axis direction and may be arranged parallel to each other. Thus, the first transparent electrodes 110 and the second transparent electrodes 120 may be disposed to cross each other.

As depicted in FIG. 3, the cell regions 160 may be regions where the first transparent electrodes 110 and the second transparent electrodes 120 cross each other, and may be two dimensional array regions. Each cell region 160 may include the piezoelectric nanowires 162 and the insulating filler 164 filled between the piezoelectric nanowires 162. The operation of the non-contact touch panel 100 according to example embodiments will now be described with reference to the drawings.

When an alternating current voltage pulse is applied to the ultrasonic wave generator 130, the piezoelectric nanowires 162 of the cell regions 160 vibrate and generate an ultrasonic wave having a frequency that is propagated onto the second transparent substrate 104.

When an object, for example, a finger approaches the non-contact touch panel 100 from above, the ultrasonic wave may be reflected from the finger and may be incident towards the non-contact touch panel 100. The incident ultrasonic wave at this moment may be propagated to the piezoelectric nanowires 162 and the insulating filler 164 of the cell region 160 corresponding to the object (or the finger). In the corresponding cell region 160, vibration may be generated in response to the incident ultrasonic wave, and thus, electricity may be generated. The first pulse echo sensor 140 and the second pulse echo sensor 150 scan the first transparent electrodes 110 and the second transparent electrodes 120 to detect the first transparent electrode 110 and the second transparent electrode 120 that are positioned on the corresponding cell region 160 located nearest to the finger. Thus, the cell region 160, where the first transparent electrode 110 and the second transparent electrode 120 cross each other, may be detected.

The non-contact touch panel 100, according to example embodiments, may detect the cell region 160 to point out using a non-contact method; however, example embodiments are not limited thereto. For example, when pressure is applied to the non-contact touch panel 100 using the finger, the current changes that occur at the first transparent electrode 110 and the second transparent electrode 120 connected to the piezoelectric nanowires 162 of the cell region 160 to be pointed out, may be detected by the first pulse echo sensor 140 and the second pulse echo sensor 150, and thus, the non-contact touch panel 100 may be used in a contact method.

Because the non-contact touch panel 100, according to example embodiments, is operated in a non-contact method, damage to the surface of the non-contact touch panel 100 may be prevented or reduced when the non-contact touch panel 100 is applied to a larger-scale touch panel.

Figure 4A:
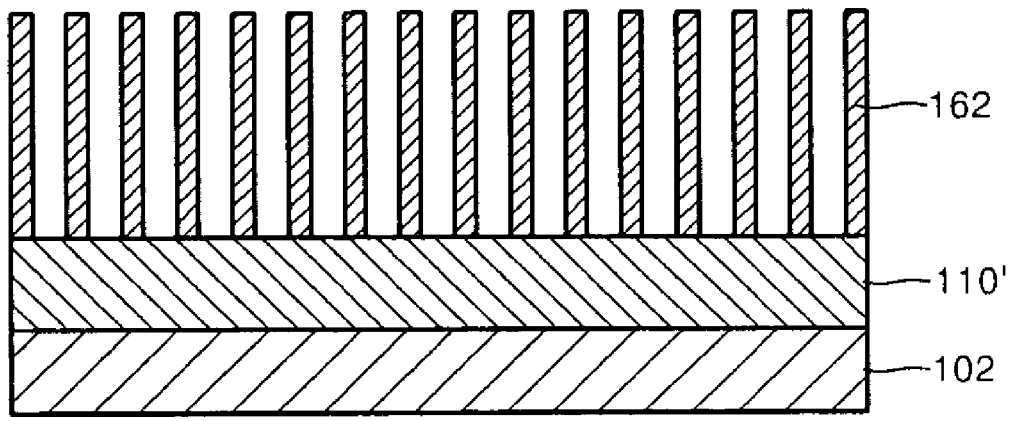
Figure 4B:
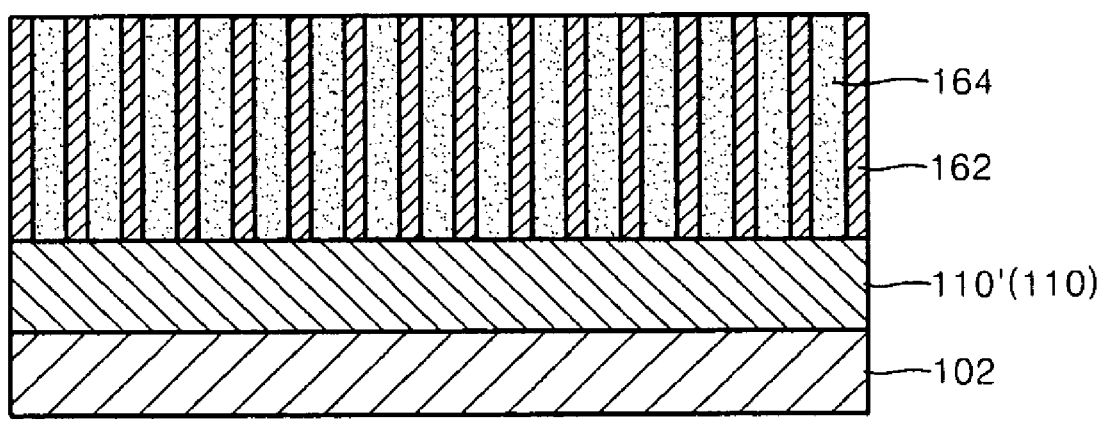
Figure 4C:
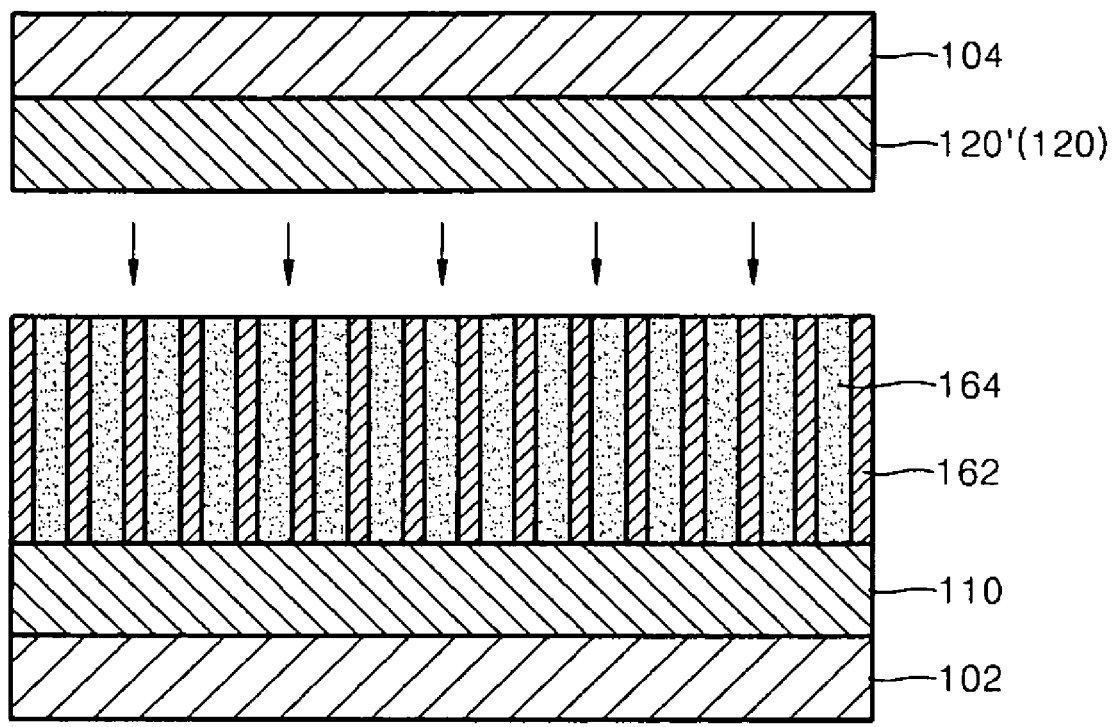

FIGS. 4A through 4C are cross-sectional views of a method of manufacturing a touch panel, for example a non-contact touch panel, using nanowires, according to example embodiments. Like reference numerals are used to indicate substantially identical elements to the elements of example embodiments illustrated in FIG. 3, and thus, the detailed descriptions thereof are not repeated.

Referring to FIG. 4A, a first transparent electrode layer 110' may be formed on the first transparent substrate 102 using, for example, ITO, AZO, or IZO. The piezoelectric nanowires 162 may be vertically grown on the first transparent electrode layer 110'. If the piezoelectric nanowires 162 are formed of ZnO, the piezoelectric nanowires 162 may be grown at a temperature of, for example, about 300° C. or less. Thus, the deformation of the first transparent substrate 102 and the first transparent electrode layer 110' during growth of the ZnO nanowires may be prevented or reduced. Various ways of growing the ZnO nanowires at a lower temperature are well known in the art. For example, the ZnO nanowires may be grown using an aqueous solution synthetic method, a thermal chemical vapour deposition (TCVD) method, a reactive evaporation method, a spray pyrolysis method, a pulse laser deposition (PLD) method, a chemical vapour deposition (CVD) method, a sputtering method, a plasma enhanced chemical vapor deposition (PECVD) method, an atomic layer deposition (ALD) method, or a metal organic chemical vapor deposition (MOCVD) method.

Referring to FIG. 4B, the insulating filler 164 may be formed between the piezoelectric nanowires 162 using a well-known process, for example, a sol-gel process. As described above, the insulating filler 164 may be formed of $SiO_2$ and may be formed higher than the piezoelectric nanowires 162 to cover the piezoelectric nanowires 162. In example embodiments, the piezoelectric nanowires 162 may be exposed through a planarizing process, e.g. a chemical mechanical polishing (CMP).

As depicted in FIG. 2, the first transparent electrodes 110 having a strip shape and parallel to each other may be formed by sequentially patterning the piezoelectric nanowires 162, the insulating filler 164, and the first transparent electrode layer 110'. For example, the piezoelectric nanowires 162 and the first transparent electrode layer 110' may be simultaneously patterned through etching so that the first transparent electrodes 110 may be formed to extend in an x-axis direction (refer to FIG. 2). The piezoelectric nanowires 162 may be patterned along a y-axis direction (refer to FIG. 2) through etching, and thus, the piezoelectric nanowires 162 may be formed in the cell regions 160 arranged in two dimensions.

Referring to FIG. 4C, a second transparent electrode layer 120' may be formed on a bottom surface of the second transparent substrate 104. Afterwards, although not shown, the second transparent electrodes 120 may be formed to extend in the y-axis direction by patterning the second transparent electrode layer 120' through etching. Patterning the second transparent electrode layer 120' may be performed to correspond to the y-axis arrangement of the cell regions 160. The second transparent substrate 104 and the second transparent electrodes 120 is formed on the piezoelectric nanowires 162 and the insulating filler 164 that may be formed on the first transparent electrodes 110, and thus, the non-contact touch panel 100 according to example embodiments may be manufactured.

As described above, according to example embodiments, the non-contact touch panel may perform better by using ZnO nanowires, having a higher optical transmittance and a higher piezoelectric constant, as a piezoelectric device. Also, the ZnO nanowires may be grown at a lower temperature, and as a result, the damage to other parts during forming the piezoelectric device may be reduced.

While example embodiments may have been particularly shown and described, it will be understood by one skilled in the art that various changes in form and details may be made therein without departing from the spirit and scope of the claims. Example embodiments should be considered in descriptive sense only and not for purposes of limitation. Therefore, the scope of example embodiments are defined not by the detailed description of example embodiments but by the claims, and all differences within the scope will be construed as being included in example embodiments.

What is claimed is:

1. A touch panel comprising:
   a first transparent substrate;
   a plurality of first transparent electrodes having a strip shape on the first transparent substrate;
   a plurality of piezoelectric nanowires vertically on the first transparent electrodes;
   a plurality of second transparent electrodes having a strip shape to perpendicularly cross the plurality of first transparent electrodes on the plurality of the piezoelectric nanowires;
   a second transparent substrate on the plurality of second transparent electrodes;
   an ultrasonic wave generator configured to generate an ultrasonic wave from the plurality of piezoelectric nanowires by applying a pulse voltage to the ultrasonic wave generator; and
   at least one ultrasonic wave echo sensor configured to detect ultrasonic waves that are generated from the plurality of piezoelectric nanowires and returned to the plurality of piezoelectric nanowires after colliding with an object approaching the plurality of piezoelectric nanowires.

2. The touch panel of claim 1, wherein the ultrasonic wave generator is connected to the plurality of first transparent electrodes or the plurality of second transparent electrodes.

3. The touch panel of claim 1, wherein the at least one ultrasonic wave echo sensor comprises:
   a first ultrasonic wave echo sensor connected to the plurality of first transparent electrodes; and
   a second ultrasonic wave echo sensor connected to the plurality of second transparent electrodes.

4. The touch panel of claim 1, wherein the plurality of piezoelectric nanowires are a plurality of ZnO nanowires.

5. The touch panel of claim 1, further comprising:
   an insulating filler between the plurality of piezoelectric nanowires.

6. The touch panel of claim 5, wherein the insulating filler is formed of $SiO_2$ or a poly vinyl difluoride (PVDF) group material.

7. The touch panel of claim 1, wherein the plurality of piezoelectric nanowires are on regions where the plurality of first transparent electrodes and the plurality of second transparent electrodes cross each other.

8. The touch panel of claim 1, wherein the plurality of first and second transparent electrodes are formed of a material selected from the group consisting of indium tin oxide (ITO), aluminum zinc oxide (AZO), and indium zinc oxide (IZO).

9. The touch panel of claim 1, wherein the plurality of piezoelectric nanowires are formed to have a height of about 0.1 μm to 10 μm.

* * * * *